US010097440B2

(12) United States Patent
Kaplinger et al.

(10) Patent No.: US 10,097,440 B2
(45) Date of Patent: Oct. 9, 2018

(54) USER INTERFACE ELEMENT ADJUSTMENT USING WEB ANALYTICS

(71) Applicant: International Business Machines Corporation, Armonk, NY (US)

(72) Inventors: Todd E. Kaplinger, Raleigh, NC (US); Victor S. Moore, Lake City, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 613 days.

(21) Appl. No.: 14/315,363

(22) Filed: Jun. 26, 2014

(65) Prior Publication Data

US 2015/0378575 A1   Dec. 31, 2015

(51) Int. Cl.
*G06F 3/048* (2013.01)
*H04L 12/26* (2006.01)
*G06F 17/30* (2006.01)
*H04L 29/08* (2006.01)
*G06F 9/451* (2018.01)

(52) U.S. Cl.
CPC .............. *H04L 43/10* (2013.01); *G06F 3/048* (2013.01); *G06F 9/451* (2018.02); *G06F 17/30* (2013.01); *H04L 67/22* (2013.01)

(58) Field of Classification Search
None
See application file for complete search history.

(56) References Cited

U.S. PATENT DOCUMENTS

| | | | |
|---|---|---|---|
| 7,185,286 B2 | 2/2007 | Zondervan et al. | |
| 7,246,306 B2 | 7/2007 | Chen et al. | |
| 7,480,858 B2 | 1/2009 | Chen et al. | |
| 7,925,691 B2 | 4/2011 | Westphal | |
| 7,930,646 B2 | 4/2011 | De Souza Sana et al. | |
| 8,302,016 B2 * | 10/2012 | Goto ................. | G06F 17/30899 715/742 |
| 8,375,351 B2 | 2/2013 | Ahadian et al. | |
| 8,448,074 B2 | 5/2013 | Forutanpour et al. | |
| 8,504,681 B1 | 8/2013 | Cooper et al. | |
| 8,595,186 B1 * | 11/2013 | Mandyam ................. | G06F 8/38 707/632 |
| 8,739,126 B2 | 5/2014 | Glaser et al. | |

(Continued)

FOREIGN PATENT DOCUMENTS

CN    103049271 A    4/2013

OTHER PUBLICATIONS

U.S. Appl. No. 14/315,367 entitled "Self-Documentation for Representational State Transfer (REST) Application Programming Interface (API)" filed Jun. 26, 2014.

(Continued)

*Primary Examiner* — Hua Lu
(74) *Attorney, Agent, or Firm* — Edward J. Wixted, III (57) ABSTRACT

In an approach for adjusting presentation of user interface (UI) elements in a webpage, a processor monitors usage of a webpage by one or more users. A processor determines at least one UI element to be modified within presentation of the webpage, based on at least one predefined rule and the monitored usage of the webpage by the one or more users. A processor generates a version of the webpage comprising the at least one UI element, as modified within the presentation of the webpage.

20 Claims, 5 Drawing Sheets

(56) References Cited

U.S. PATENT DOCUMENTS

| | | | |
|---|---|---|---|
| 8,843,844 B2* | 9/2014 | Laubach | G06F 3/0238 |
| | | | 345/168 |
| 8,856,735 B2 | 10/2014 | Nimashakavi et al. | |
| 9,047,259 B1* | 6/2015 | Ho | G06F 17/30882 |
| 9,189,244 B2 | 11/2015 | McMahon et al. | |
| 9,230,030 B2 | 1/2016 | Xue et al. | |
| 2003/0051059 A1 | 3/2003 | Zondervan et al. | |
| 2003/0200533 A1 | 10/2003 | Roberts et al. | |
| 2004/0205513 A1 | 10/2004 | Chen et al. | |
| 2007/0016848 A1* | 1/2007 | Rosenoff | G06F 17/30014 |
| | | | 715/205 |
| 2008/0046507 A1 | 2/2008 | Westphal | |
| 2008/0046562 A1* | 2/2008 | Butler | G06F 17/3089 |
| | | | 709/224 |
| 2008/0228910 A1 | 9/2008 | Petri | |
| 2008/0250394 A1 | 10/2008 | Jones et al. | |
| 2008/0320441 A1 | 12/2008 | Ahadian et al. | |
| 2009/0106687 A1 | 4/2009 | De Souza Sana et al. | |
| 2009/0303676 A1* | 12/2009 | Behar | G06F 1/162 |
| | | | 361/679.27 |
| 2010/0077321 A1 | 3/2010 | Shen et al. | |
| 2010/0161785 A1 | 6/2010 | Xue et al. | |
| 2010/0199197 A1 | 8/2010 | Faletski et al. | |
| 2010/0251128 A1* | 9/2010 | Cordasco | G06F 11/328 |
| | | | 715/736 |
| 2011/0087966 A1* | 4/2011 | Leviathan | G06F 17/30905 |
| | | | 715/745 |
| 2011/0099185 A1 | 4/2011 | Trevor et al. | |
| 2011/0161465 A1 | 6/2011 | Kowalski | |
| 2012/0060087 A1* | 3/2012 | Jame | G06F 17/30905 |
| | | | 715/238 |
| 2012/0066601 A1* | 3/2012 | Zazula | H04N 21/854 |
| | | | 715/733 |
| 2012/0140255 A1* | 6/2012 | Tanaka | G06F 9/445 |
| | | | 358/1.13 |
| 2012/0240019 A1* | 9/2012 | Nuzzi | G06F 17/30867 |
| | | | 715/205 |
| 2012/0310899 A1 | 12/2012 | Wasserman et al. | |
| 2013/0055097 A1* | 2/2013 | Soroca | G06Q 30/0247 |
| | | | 715/738 |
| 2013/0073945 A1 | 3/2013 | Bingell et al. | |
| 2013/0080910 A1* | 3/2013 | Bingell | G06F 3/048 |
| | | | 715/744 |
| 2013/0205279 A1* | 8/2013 | Osminer | G06F 9/44589 |
| | | | 717/123 |
| 2014/0026113 A1* | 1/2014 | Farooqi | G06F 8/36 |
| | | | 717/107 |
| 2014/0143304 A1* | 5/2014 | Hegarty | G06F 11/3438 |
| | | | 709/203 |
| 2014/0372970 A1 | 12/2014 | Broussard et al. | |
| 2015/0007128 A1 | 1/2015 | Yu et al. | |
| 2015/0046856 A1* | 2/2015 | Rucker | G06F 3/04883 |
| | | | 715/765 |
| 2015/0187224 A1* | 7/2015 | Moncrief | G09B 9/052 |
| | | | 434/30 |
| 2015/0264105 A1* | 9/2015 | V | H04L 67/02 |
| | | | 709/201 |
| 2015/0378575 A1 | 12/2015 | Kaplinger et al. | |
| 2015/0378579 A1 | 12/2015 | Kaplinger et al. | |
| 2015/0378684 A1 | 12/2015 | Kaplinger et al. | |
| 2015/0378685 A1 | 12/2015 | Kaplinger et al. | |
| 2015/0378994 A1 | 12/2015 | Kaplinger et al. | |
| 2018/0115899 A1* | 4/2018 | Kedem | G06F 21/31 |

OTHER PUBLICATIONS

U.S. Appl. No. 14/315,372 entitled "Mobilize Website Using Representational State Transfer (REST) Resources" filed Jun. 26, 2014.
U.S. Appl. No. 14/315,376 entitled "Mobilizing an Existing Web Application" filed Jun. 26, 2014.
Appendix P List of IBM Patents or Patent Applications Treated as Related.
Appendix P: List of IBM Patents or Patent Applications Treated as Related, dated Jun. 26, 2014, 2 pages.
Appendix P: List of IBM Patents or Patent Applications Treated as Related, dated Jan. 26, 2015, 2 pages.
Serwatka, "Building native mobile applications with the eZ Publish REST API", eZ Community Knowledge Base : <http://share.ez.no/learn>, The eZ Publish Community Gateway, Oct. 13, 2011, 38 pages.
U.S. Appl. No. 14/604,806, filed Jan. 26, 2015; Entitled "Mobilizing an Existing Web Application".
List of IBM Patents or Patent Applications Treated as Related.
Ravindranath, et al.; "Procrastinator: Pacing Mobile Apps' Usage of the Network"; MobiSys'14; Jun. 16-19, 2014, ACM, pp. 1-13.
Anubavam; "Website to mobile app"; retrived on Jan. 23, 2014 from website: <http://www.anubavam.com/website-to-mobile-app>.
Anonymous; "Method and System for Rendering Simplified Content Mobile Devices"; An IP.com Prior Art Database Technical Disclosure; IPCOM000204076D; IP.com Electronic Publication: Feb. 10, 2011.
Anonymous; "Mobilizing an Existing Web Application: Method of Runtime Code Adaptation", An IP.com Prior Art Database Technical Disclosure; IPCOM000223897D; IP.com Electronic Publication: Dec. 5, 2012.
Anonymous; "Method and System for Automatically Analyzing a Website for Converting to a Mobile Web Application"; An IP.com Prior Art Database Technical Disclosure; IPCOM000223896D; IP.com Electronic Publication: Dec. 5, 2012.
Anonymous, "Mobilizing an Existing Web Application: Method to Optimize REST Calls in Client for a Mobile Environment"; An IP.com Prior Art Database Technical Disclosure; IPCOM000223898D; IP.com Electronic Publication: Dec. 5, 2012.
Apache CXF; "JAX-RS Services Description"; Retrieved on Jan. 22, 2014 from website: <http://cxf.apache.org/docs/jaxrs-services-description.html>.
Beryozkin; "Musings About Web Services"; Sunday, Oct. 2, 2011; Retrieved from website: <http://sberyozkin.blogspot.com/2011/10/describing-json-services-in-web . . . >.
Buddy Media; "Manage and publish social content using Buddy Media"; Retrieved on Jan. 22, 2014 from website: <http://www.salesforcemarketingcloud.com/sem/buddymedia . . . >.
Careveo; "Using json-schema for exploring API servers"; Jun. 30, 2011, Retrieved from website: <http://shane.caraveo.com/2011/06/30/using-json-schema-for-exploring . . . >.
Chen, et al.; "Coordinated data prefetching for web contents"; Elsevier, Science Direct; copyright 2005 Elsevier B.V.; doi: 10.1016/j.comcom.2005.04.003.
Flynn; "IBM Web Experience Factory: Web Experience Factory"; IBM; Retrieved on Jan. 23, 2014 from website: <http://www-10.lotus.com/ldd/pfwiki.nsf/dx/IBM_Web_Experience_Factory . . . >.
Forge; "The fastest way to build applications, share your software, and enjoy doing it"; JBoss Forge; Retrieved on Jan. 23, 2014 from website: <http://forge.jboss.org/?_sscc=t>.
Gerasika; "How to Convert JSON to XML Using ANTLR"; GerixSoft, Saturday, Jun. 11, 2011; Retrieved from website: <http://www.gerixsoft.com/blog/xslt/json2xml2>.
Gerasika; "How to Convert JSON to XML Using XSLT 2.0"; GerixSoft, Saturday, Jul. 3, 2010; Retrieved from website: <http://www.gerixsoft.com/blog/xslt/json2xml7>.
Golega et al.; "Generating Web Applications from Process Models"; ICWE '06 Workshops; Jul. 10-14, 2006; Palo Alto, CA; Copyright 2006 ACM 1-59593-435-09/06/07.
Google Analytics; "Analytics Collection"; last updated Jul. 9, 2013; Retrieved from website: <https://developers.google.com/analytics/devguides/collection/>.
Giunipero; "Creating a Simple Web Application Using MySQL Database"; Retrieved on Jan. 23, 2014 from website: <https://netbeans.org/kb/docs/web/mysql-webapp.html>.
Guest Author; "Paint by Numbers: Guided Design Through Web Analytics"; Dec. 9, 2010; Retrieved from website: <http://blog.sigmamarketing.com/2010/12/paint-by-numbers-guided-design . . . >.

(56) References Cited

OTHER PUBLICATIONS

IBM; "IBM Security AppScan"; IBM Software; Retrieved on Jan. 23, 2014 from website: <http://www-03.ibm.com/software/products/en/appscan>.

Jersey; "Extended WADL example for JSON"; Retrieved on Jan. 22, 2014 from website: <http://jersey.576304.n2.nabble.com/Extended-WADL-example-for-JSON>.

Kumar et al.; "A Predicted Region based Cache Replacement Policy for Location Dependent Data in Mobile Environment"; I.J. Communications; Network and System Sciences, 2008; 1: 1-103; Copyright 2008 SciRes.

Paolini; "Web Analytics & Search: What's Happening to My Traffic?"; Jun. 8, 2010; MPThree Consulting Inc.; Retrieved from website: <http://mpaolini.com/web-analytics-the-basics>.

PR Newswire Services; "New Wily 6 Solution Delivers Unmatched End-to-End Web Application Management"; Source is Wily Technology, Inc.; Retrieved on Jan. 23, 2014 from website: <http://www.prnewswire.com/news-releases/new-wily-6-solution-delivers . . . >.

Programmable Web; Rest API Design: Put the "Type" in "Content-Type"; Nov. 18, 2011; Retrieved from website: <http://blog.programmableweb.com/2011/11/18/rest-api-design-putting . . . >.

Serwatka; "Building native mobile applications with eZ Publish REST API"; eZ Community Knowledge Base; <http://share.ez.no/learn>; the eZ Publish Community Gateway.

Stack Overflow; "Create and link XSD to WADL"; Retrieved on Jan. 22, 2014 from website: <http://stackoverflow.com/questions/6168573/create-and-link-xsd-to-a . . . >.

Stack Overflow; "Is it possible to convert web application to mobile application?"; Retrieved on Jan. 23, 2014 from website: <http://stackoverflow.com/questions/743348/is-it-possible-to-convert . . . >.

Tiggzi, "Tiggzi—Features"; Product website; Retrieved on Jan. 23, 2014 from website: <https://web.archive.org/web/20130329010933/http://tiggzi.com/features#>.

Veracode; "Vulnerability Scanning Tools"; Copyright 2006-2013 Veracode Inc.; Burlington, MA; Retrieved from website: <http://www.veracode.com/security/vulnerability-scanning>.

Verborgh; "Easy restfull JAX-RS webservices and extended WADL on Glassfish v3 (using ant.)"; Nov. 21, 2009; Retrieved from website: <http://www.verborgh.be/articles/2009/11/21/easy-restfull-jax-rs-webservices . . . >.

Wikipedia; "List of graphical user interface builders and rapid application development tools"; Retrieved on Jan. 23, 2014 from website: <http://en.wikipedia.org/w/index.php?title=List_of_user_interface . . . >.

Wikipedia; "Web log analysis software"; Retrieved on Jan. 22, 2014 from website: <http://en.wikipedia.org/w/index.php?title=Web_log_analysis_software . . . >.

Zucker; "What is "Integrated Analytics"?"; Bridgeline Software; Whitepaper; Copyright 2009 Bridgeline Software Inc.; Woburn, MA.

Machi: "dojox.analytics"; dojo; dojo.analytics—The Dojo Toolkit—Reference Guide; Printed Jan. 22, 2014; <http://dojotoolkit.org/reference-guide/1.7/dojoxianalytics.html#dojox- . . . >.

Serwatka, Lukasz, "Building mobile browser and hybrid applications with eZ Publish", Jul. 7, 2011, eZ Community Knowledge Base, pp. 1-41, Retrieved from http://share.ez.no/learn/ez-publish/building-mobile-browser-and-hybrid-applications-with-ez-publish/(language)/eng-GB on Oct. 16, 2015.

* cited by examiner

USER INTERFACE ELEMENT ADJUSTMENT USING WEB ANALYTICS

FIELD OF THE INVENTION

The present invention relates generally to the field of web development, and more particularly to adjusting user interface (UI) elements based on web analytics.

BACKGROUND OF THE INVENTION

Web analytics is the measurement, collection, analysis and reporting of web data for purposes of understanding and optimizing web usage. Web analytics can be used as a tool to assess and improve the effectiveness of a web site. Web analytics may be off-site, on-site, or a combination of the two. Off-site web analytics refers to web measurement and analysis regardless of whether a person owns a website, and includes the measurement of a website's potential audience, webpage loading time, data accessed, type of device used to access the site by a user, and potentially other information. On-site web analytics can be used by the owner of a website to measure a visitor's behavior on the website. On-site web analytics can include UI widget element accesses, user inaction, user interactions on a webpage, inaction on a webpage (e.g., hovering a mouse), mouse clicks on a webpage, and potentially other information.

The mobile web refers to access to the Internet from a handheld mobile device, such as a smartphone connected to a mobile network or other wireless network. Mobile devices can include smartphones, netbooks, tablets, e-books, and other devices with a variety of screen sizes and input capabilities (e.g., touchscreen, mouse, keyboard, etc.).

SUMMARY

Aspects of an embodiment in accordance with the present invention disclose a method, computer program product, and computing system for adjusting presentation of user interface (UI) elements in a webpage. A processor monitors usage of a webpage by one or more users. A processor determines at least one UI element to be modified within presentation of the webpage, based on at least one predefined rule and the monitored usage of the webpage by the one or more users. A processor generates a version of the webpage comprising the at least one UI element, as modified within the presentation of the webpage.

DETAILED DESCRIPTION

Embodiments in accordance with the present invention recognize that webpage effectiveness is dependent upon the organizational structure and layout of the webpage. Users access webpages with a variety of devices, such as laptops, netbooks, e-books, smartphones, tablets, and other devices. Devices used to access a webpage have different benefits and drawbacks due to factors such as screen size, bandwidth limitations, input capabilities, and other characteristics. It is a desirable outcome in the field of web development to automate webpage layout and presentation based on web analytic techniques, as well as the type of device used to access the webpage. Adjusting aspects of the layout of a webpage at runtime can enable a webpage to remain relevant for users of the webpage.

The present invention will now be described in detail with reference to the Figures.

Figure 1:
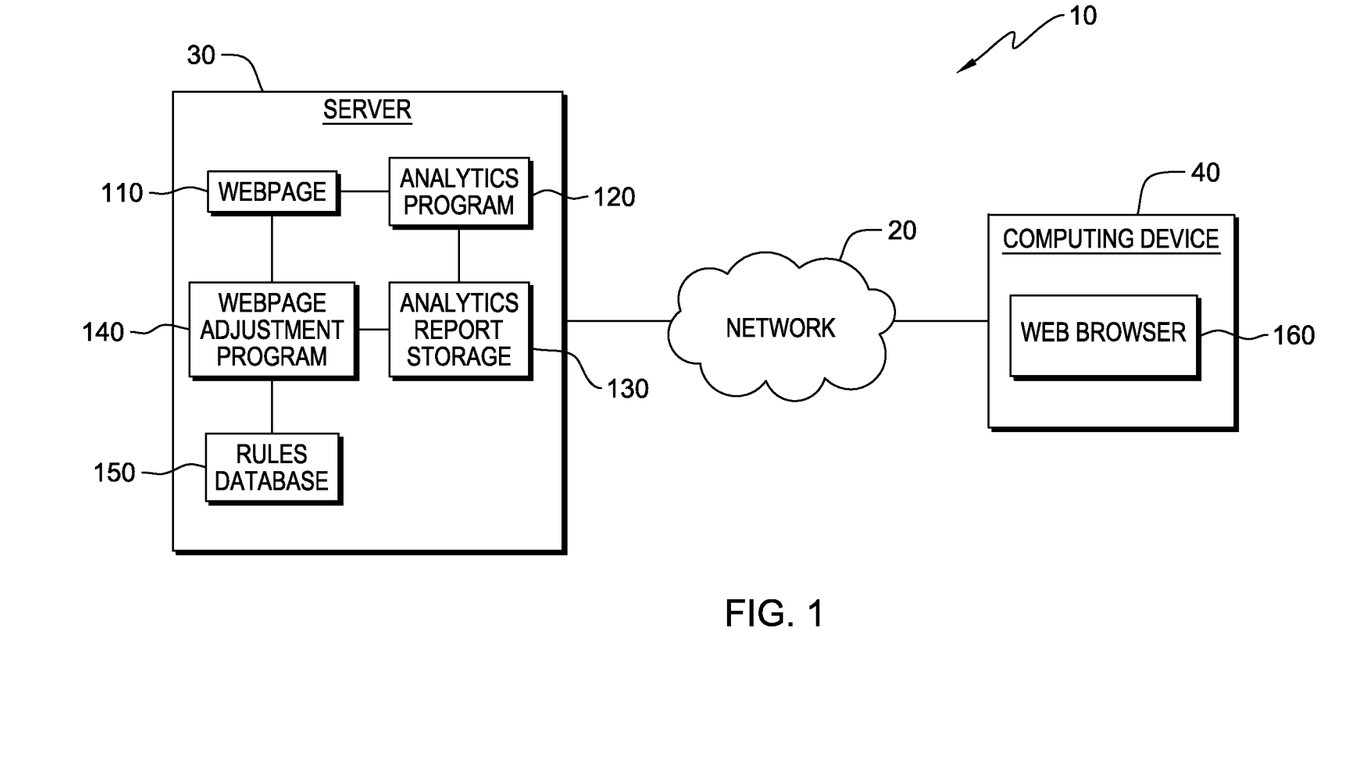
FIG. 1 depicts a diagram of a computing system, in accordance with one embodiment of the present invention.

FIG. 1 depicts a diagram of computing system 10, in accordance with one embodiment of the present invention. FIG. 1 provides only an illustration of one embodiment and does not imply any limitations with regard to the environments in which different embodiments may be implemented.

In the depicted embodiment, computing system 10 includes server 30 and computing device 40 interconnected over network 20. Network 20 may be a local area network (LAN), a wide area network (WAN) such as the Internet, the public switched telephone network (PSTN), any combination thereof, or any combination of connections and protocols that will support communications between server 30 and computing device 40, in accordance with embodiments of the invention. Computing system 10 may include additional computing devices, servers, computers, or other devices not shown.

Server 30 may be a management server, a web server, or any other electronic device or computing system capable of processing program instructions, receiving and sending data. In some embodiments, server 30 may be a laptop computer, tablet computer, netbook computer, personal computer (PC), a desktop computer, or any programmable electronic device capable of communicating with computing device 40 and/or other computing devices via network 20. In other embodiments, server 30 may represent a server computing system utilizing multiple computers as a server system, such as in a cloud computing environment. Server 30 contains webpage 110, analytics program 120, analytics report storage 130, webpage adjustment program 140, and rules database 150. Server 30 may include components, as depicted and described in further detail with respect to FIG. 4.

Webpage 110 is any web document containing information accessible to other computing devices, such as computing device 40, through a web browser over network 20. Webpage 110 may include one or more widgets (e.g., JavaScript widgets), page objects, user interface elements, images, or other elements. A widget is a stand-alone, or self-contained, application or set of script or code for use within a webpage, such as webpage 110. In general, webpage 110 is any webpage capable of being monitored by analytics program 120 and capable of having alterable user interface elements, such as links, menu items, or other elements.

Analytics program 120 is a web analytics tool or other analytics software that operates to collect and display data about users visiting a webpage, such as webpage 110. In general, analytics program 120 is any analytics, or web analytics program, capable of collecting, analyzing, and/or reporting data related to usage of a webpage, such as webpage 110. In some embodiments, analytics program 120 performs an external, or off-site analysis of webpage 110, and collects information related to hyper-text markup language (HTML) pages loaded, data accessed, widgets used, or other information. Typically, external analysis is used to provide analysis for websites that are designed to request one page at a time from the server. In some embodiments, analytics program 120 performs an internal, or on-site analysis of webpage 110, and collects information, such as: user idle time, mouse clicks on webpage 110, items or objects used on webpage 110, cursor location, cursor hovering, or other information. In some embodiments, analytics program 120 performs both internal and external analysis functions.

In some embodiments, analytics program 120 generates analytics reports or a set of information gathered from a webpage, such as webpage 110, and stores the information to analytics report storage 130. An analytics report may include information related to a particular version of webpage 110 and include information related to the usage of webpage 110 over a specified time period. In some embodiments, analytics program 120 collects data from a webpage, such as webpage 110, by accessing server log files, in which a web server records file requests by browsers (e.g., access logs). In some embodiments, analytics program 120 uses a page tagging method, wherein JavaScript embedded in the site page is used to make image requests to a third-party analytics-dedicated server, whenever a page is rendered by a web browser, or whenever a mouse click occurs. Analytics program 120 may utilize additional data sources to augment the web site and web site behavior data described herein. In some embodiments, an analytics report may include information relevant to a web developer regarding the use, or lack of use, of certain pages, portions of the page, or pieces of data used within a website or webpage 110. In some embodiments, analytics program 120 is a function of webpage adjustment program 140. In other embodiments, analytics program 120 is a stand-alone web analytics tool or analysis software/application. In some embodiments, analytics program 120 resides on server 30. In other embodiments, analytics program 120 may reside on another server or another computing device, provided that analytics program 120 has access to webpage 110 and analytics report storage 130.

Analytics report storage 130 may be a repository that may be written and/or read by analytics program 120 and webpage adjustment program 140. Analytics reports and web analytics information gathered, recorded, deciphered or otherwise observed by analytics program 120 may be stored to analytics report storage 130. For example, analytics information, the time the information was gathered, identifying characteristics of users, and other information may be stored to analytics report storage 130. In one embodiment, analytics report storage 130 resides on server 30. In other embodiments, analytics report storage 130 may reside on another server, another computing device, or computing device 40, provided that analytics report storage 130 is accessible to analytics program 120 and webpage adjustment program 140.

Webpage adjustment program 140 operates to retrieve analytics information, such as analytics information stored to analytics report storage 130, and rules, such as rules stored to rules database 150, to adjust and/or populate user interface elements of a webpage, such as webpage 110. In some embodiments, webpage adjustment program 140 further considers multiple types of devices and adjusts and/or populates user interface elements of webpages, such as webpage 110, based upon the type of device that may access the information. In some embodiments, webpage adjustment program 140 adjusts and/or populates user interface elements of webpages, such as webpage 110, based upon usage patterns observed by analytics program 120. For example, usage patterns of webpage 110 may vary based upon the time webpage 110 was accessed, the type of device upon which a user accessed webpage 110, or other identified patterns. In some embodiments, webpage adjustment program 140 retrieves analytics information from analytics report storage 130. In some embodiments, webpage adjustment program 140 retrieves rules associated with a webpage, such as webpage 110 from rules database 150. In one embodiment, webpage adjustment program 140 resides on server 30. In other embodiments, webpage adjustment program 140 may reside on another server, another computing device, or computing device 40, provided that website adjustment program 140 has access to webpage 110, analytics report storage 130, and rules database 150.

Rules database 150 may be a repository that may be written and/or read by webpage adjustment program 140. In some embodiments, a program (not shown) may allow a web developer, administrator, or other user to define rules and write the defined rules to rules database 150. Rules relevant to the layout or population of data on a webpage, such as webpage 110, may be stored to rules database 150. For example, rules may specify the number of links to be shown in a list on a particular device, organizational settings based on hit frequency, or settings specifying that links, page objects, or widgets should be removed from a page due to lack of use by users of webpage 110. In some embodiments, rules database 150 associates a set of one or more rules with a particular device, or type of device (e.g., smartphone, tablet, PC, etc.). For example, one set of rules stored to rules database 150 may indicate layout rules associated with smartphone devices, while a different set of rules stored to rules database 150 specifies a different set of one or more rules associated with tablet devices. In one embodiment, rules database 150 resides on server 30. In other embodiments, rules database 150 may reside on another server, another computing device, or computing device 40, provided that rules database 150 is accessible to webpage adjustment program 140.

Computing device 40 may be a desktop computer, laptop computer, netbook computer, tablet computer, personal digital assistant, or smartphone. In general, computing device 40 may be any electronic device or computing device capable of processing program instructions, sending and receiving data, and communicating with server 30 over network 20. Computing device 40 contains web browser 160. Computing device 40 may include components, as depicted and described in further detail with respect to FIG. 4.

Web browser 160 may be a generic web browser used to retrieve, present and traverse information resources from the Internet. In some embodiments, web browser 160 may be a web browser designed for a mobile device. In other embodiments, web browser 160 may be a web browser designed for a traditional computing device, such as a desktop computer, PC, or laptop. In general, web browser 160 may be any application or software that enables a user at computing device 40 to access webpage 110 over network 20. In the depicted embodiment, web browser 160 resides on computing device 40. In other embodiments, web browser 160, or similar web browsers, may reside on other computing devices capable of accessing webpage 110 over network 20.

While the depicted embodiment specifies a webpage, such as webpage 110, other embodiments in accordance with the present invention may be applied to an application or program. For example, embodiments of analytics program 120 may monitor usage information of a program (not shown) on computing device 40. Based on the usage information obtained, an alternate version of webpage adjustment program 140 may cause layout and other aspects of the program on computing device 40 to be altered. For example, menu items within the program may be reorganized, frequently used menu items may become toolbar icons, and information most frequently viewed may be placed in a prominent position within the program, according to similar methods described herein with regard to webpage 110 and webpage adjustment program 140.

Figure 2:
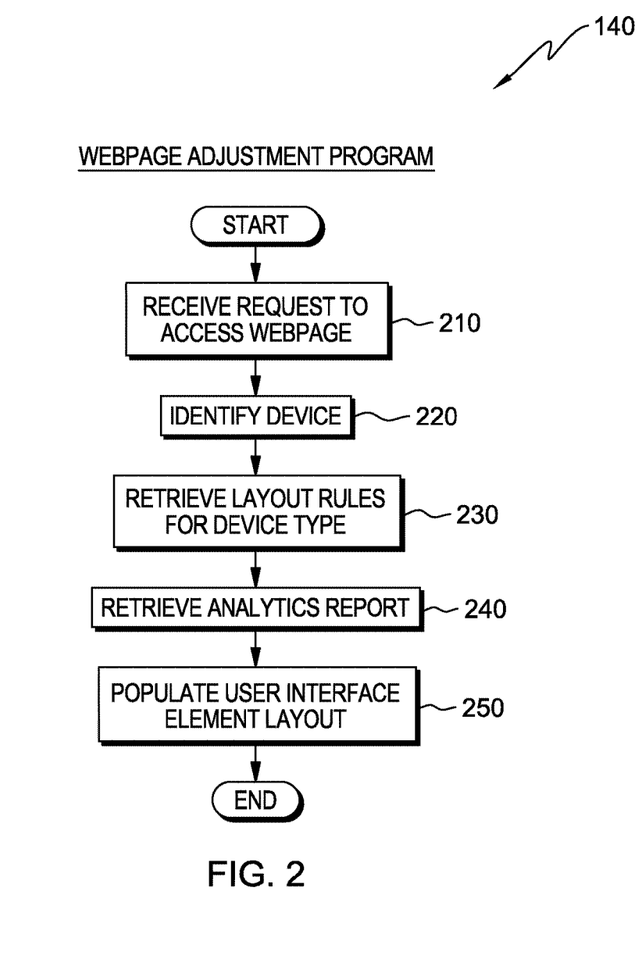
FIG. 2 depicts the flowchart of the steps of a webpage adjustment program executing within the computing system of FIG. 1, for adjusting user interface (UI) elements within a webpage based on web analytics, accessing device type, and/or other information, in accordance with one embodiment of the present invention.

FIG. 2 depicts a flowchart of the steps of webpage adjustment program 140, executing within the computing system of FIG. 1, in accordance with an embodiment of the present invention. Webpage adjustment program 140 operates to adjust the presentation, display, and/or layout of UI elements within webpage 110, based on usage information and analytics information gathered by analytics program 120, in accordance with an illustrative embodiment. Using a series of predefined rules, webpage adjustment program 140 can generate different forms of webpage 110 based on factors such as time of access, accessing device, as well as web analytics information (e.g., popular links, time spent on page, user idle time, etc.).

In one embodiment, initially, a web developer or other user may create webpage 110. Webpage 110 may be a single webpage or a website comprising multiple web pages. While not depicted, it should be noted that webpage 110 may be a software program or application, rather than a webpage or website, wherein a program or tool similar to analytics program 120 may monitor usage and gather analytical information related to usage by one or more users of the software program or application. A web developer or other user may also utilize one or more analytics tools, such as analytics program 120, to monitor webpage 110 and gather usage information by users accessing or attempting to access webpage 110.

Analytics program 120 may include internal (e.g., on-site), and/or external (e.g., off-site) analytics techniques for gathering usage information. Embodiments of analytics program 120 may monitor externally accessible information, such as HTML pages loaded, data accessed, widgets (e.g., JavaScript widgets) used, types of devices used to access webpage 110, or the presence of UI artifacts, such as images or other information within cascading style sheets (CSS). Embodiments of analytics program 120 may also monitor internal information, such as cursor location, mouse clicks, idle time, or other information. Cursor location, such as a cursor hovering over a field for an extended period of time, may indicate confusion by the user controlling the cursor. Similarly, idle time of a user may indicate that the user is experiencing confusion with webpage 110. Mouse clicks within webpage 110, or a website, may be used to track the items used on webpage 110, as well as previous and/or subsequent pages that were loaded (e.g., by following a trail of selected hyperlinks). In some embodiments, analytics program 120 may generate one or more reports that include a collection of web analytics and usage information. In other embodiments, analytics program 120 may store information gathered. In some embodiments, generated reports or information are stored to analytics report storage 130, for access by webpage adjustment program 140. In some embodiments, analytics program 120 may associate patterns of use based on the type of device, time of day, day of week, or other potential group that affects how users tend to use a webpage, such as webpage 110.

A web developer or other user may generate one or more rules for webpage 110 affecting the layout, presentation, and/or display of webpage 110. In some embodiments, multiple sets of rules may exist. For example, one set of rules may be directed toward a tablet device attempting to access webpage 110, while another set of rules may be directed toward a desktop environment attempting to access webpage 110. In another example, one set of rules may be directed toward a device with touchscreen capabilities, while another set of rules is directed toward devices that lack touchscreen input. Possible rules may include, but are not limited to the following: size of page elements, exclusion/inclusion of widgets or page objects based on frequency of use, level of detail within a list, number of items within a list to be displayed, type of UI element, webpage hierarchy organization within a website, or other potential rules related to layout, presentation, and/or display of UI elements within a webpage, such as webpage 110.

In some embodiments, webpage adjustment program 140 adjusts the layout of webpage 110 and populates a version of webpage 110 at runtime when computing device 40 requests to access webpage 110. In other embodiments, webpage adjustment program 140 periodically creates versions of webpage 110 based upon updated analytics information or reports generated by analytics program 120. In such an embodiment, webpage adjustment program may proceed directly to step 230 of FIG. 2.

In step 210, webpage adjustment program 140 receives a request to access webpage 110. In some embodiments, webpage adjustment program 140 may receive a request to access webpage 110 from a computing device, such as computing device 40. The request to access webpage 110 may include information indicating the type of device (e.g., smartphone, desktop computer, etc.) attempting to access webpage 110.

In step 220, webpage adjustment program 140 identifies the device, or type of device attempting to access webpage 110. In some embodiments, the request from computing device 40 (see step 210) indicates the device or type of device. In some embodiments, the type of device indicated may be, for example, a desktop device or a mobile device.

In step 230, webpage adjustment program 140 retrieves layout rules, or other applicable rules, for the identified device type. Rules, such as layout rules, may be stored to a repository, such as rules database 150. As previously described, a variety of rules may be created by a web developer of webpage 110 indicating rules relevant to the creation of additional versions of webpage 110 based on factors such as usage, time, device type, device input capabilities, page object properties, user interface element properties, or other information. For example, a rule for the creation of a version of webpage 110 may indicate that if a list has less than a specified number of items on a page, the list should display with details, but if the list has more than the specified number of items on a page, the list should be displayed with only names of each item, and a user may be able to select the item to view details of such an item. In another example, a rule may state that items in a list of selectable items (e.g., hyperlinks, selectable elements which display additional information, etc.) should be organized according to popularity, based on hit frequency over a period of time, and that if the list is large, infrequently selected items should be placed at another location, such as within a "more items" menu or selectable UI element.

In step 240, webpage adjustment program 140 retrieves applicable analytics information, usage information, or one or more reports, as generated by analytics program 120. In one embodiment, analytics program 120 retrieves the information or one or more reports from a repository accessible by analytics program 120, such as analytics report storage 130. In another embodiment, analytics program 120 passes relevant information or reports to webpage adjustment program 140. As previously mentioned, analytics reports or information may include usage information generated by analytics program 120. Usage information may include information such as widget use, HTML pages loaded, data accessed, type of devices used, cursor tracking, mouse clicks, or other information relevant to the usage of a website, such as webpage 110. In some embodiments, analytics reports or information may be linked to particular devices, device types, times of usage (e.g., day of week, date, time of day, etc.), or other information. Such information may indicate particular ways users tend to interact with webpage 110 based on the time of day, day of the week, device type used to access webpage 110, or other patterns of usage.

In step 250, webpage adjustment program 140 populates or generates the UI element layout, content, and presentation of webpage 110 based on the rules and analytics report or information. In some embodiments, webpage adjustment program 140 populates the content of webpage 110 at runtime based on a set of predefined layout rules (e.g., rules for the type of device accessing webpage 110, organizational rules based on analytics report information, etc.) and analytic report information detailing patterns of usage of webpage 110. By combining the analytics report information with the predefined rules, a webpage, such as webpage 110, may be continuously updated based upon usage patterns, temporal patterns (e.g., time of day, day of week, season), patterns associated with devices, and other information relating to the usage of webpage 110.

In some embodiments, webpage adjustment program 140 populates webpage 110 through a feedback loop process. In one example, a web developer may create a JavaScript Object Notation (JSON) configuration metadata file specifying the entire layout of webpage 110. JSON is a data-interchange format for storing and exchanging text information, similar to extensible markup language (XML). In such an example, the JSON configuration metadata file may specify views, modules, stores, models, default views, default transitions, and dependencies within a website or webpage, such as webpage 110. Similarly a JSON configuration metadata file can be generated and used to determine the content of a version of webpage 110 by specifying information such as items to be shown in a list, based on the most frequently selected items within a time period, using an analytics report generated by analytics program 120.

Figure 3A:
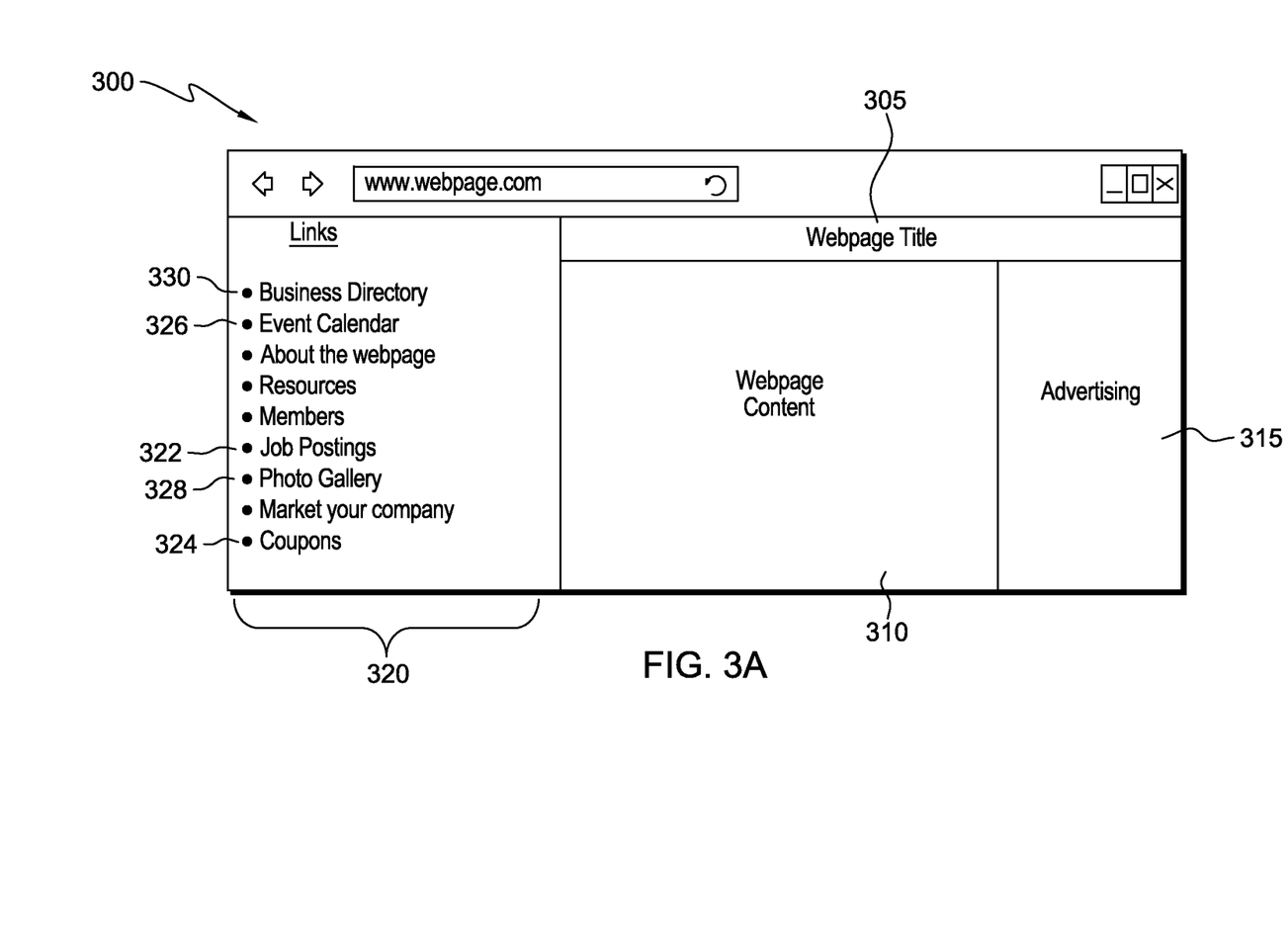
FIG. 3A is a user interface window for a desktop environment webpage, in accordance with one embodiment of the present invention.

FIG. 3A is an example UI window for a website as accessed by a desktop web browser, in accordance with one embodiment of the present invention. UI window 300 may be a user interface window for webpage 110 of server 30 as viewed by a user at a desktop environment computing device using a web browser. In the depicted embodiment, UI window 300 is the version of webpage 110 created by the web developer or other user, prior to layout, presentation, or other display adjustments generated by embodiments of webpage adjustment program 140.

UI window 300 of webpage 110 contains webpage title 305 webpage content 310, advertising 315, and links section 320. Webpage title 305 may display icons, text, or other information indicating title of the website or particular webpage. Webpage content 310 may include text, images, widgets, or other information typically displayed within the content of a webpage. Advertising 315 may include one or more advertisements.

Links section 320 may include one or more hyperlinks for navigation within the website associated with webpage 110, or for navigation to external websites or webpages. In the depicted example, links section 320 includes business directory link (link 330), event calendar link (link 326), about the webpage link, resources link, members link, job postings link (link 322), photo gallery link (link 328), market your company link, and coupons link (link 324).

In the depicted example, a web developer or other user may have generated one or more rules to apply to webpage 110 based on the type of device accessing the page. For example, a user may create a rule set that may apply to mobile devices, such as smartphones, indicating the following rules: organize hyperlink lists by popularity of selection, display five hyperlinks in a list, place any additional hyperlinks within a "more" UI selection element, hide advertising. Additional rules may apply. In some embodiments, the created rules or rule set may be stored to a repository, such as rules database 150, for access by webpage adjustment program 140.

Analytics program 120 may periodically run, or may continuously monitor aspects of usage and other information related to webpage 110, as previously described. Analytics program 120 may store reports or analytics and other usage information to analytics report storage 130, for access and retrieval by webpage adjustment program 140. In the depicted example, analytics program 120 has identified the most popularly selected links, in order of selection frequency, as follows: job postings link (link 322), coupons link (link 324), event calendar link (link 326), photo gallery link (link 328), and business directory link (link 330). Analytics program 120 has also identified that the other links of link section 320 (e.g., about the webpage link, resources link, members link, and market your company link) are infrequently selected by users accessing webpage 110. Analytics program 120 has also detected that the average user does not spend much time within UI window 300, and tends to select links rather quickly. This information may be used by embodiments of analytics program 120 or webpage adjustment program 140 to determine that users accessing webpage 110 through user interface window 300 are more interested in links section 320 than webpage content 310.

Figure 3B:
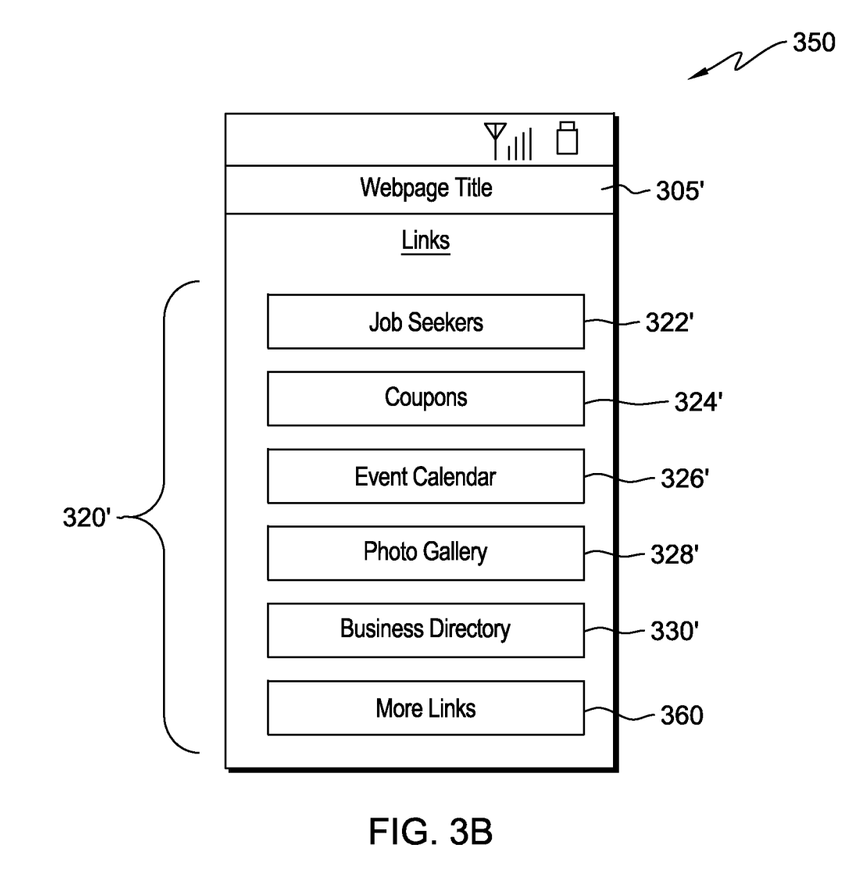
FIG. 3B is a user interface for a mobile version of the webpage of FIG. 3A as affected by a webpage adjustment program, in accordance with one embodiment of the present invention.

FIG. 3B is an example UI window for the website of FIG. 3A, as accessed by a mobile web browser, in accordance with one embodiment of the present invention. UI window 350 may be a UI window for webpage 110 of server 30 as viewed by a user at computing device 40 using web browser 160. In such an example, computing device 40 may be a mobile device such as a smartphone. In the depicted embodiment, UI window 350 is a version of webpage 110 generated by webpage adjustment program 140 for a mobile device, based upon the rules defined by the user and analytic information obtained by analytics program 120, as described with regard to FIG. 3A.

UI window 350 of webpage 110 contains webpage title 305' and links section 320'. Webpage title 305' may include a resized version of webpage title 305, as depicted in FIG. 3A. Based on information generated by analytics program 120, and rules associated with mobile devices, such as a set of rules stored to rules database 150, webpage adjustment program 140 removed webpage content 310 and advertising 315 from the version of webpage 110 selected for display to computing device 40.

Based on the set of rules for mobile devices (see discussion in FIG. 3A), webpage adjustment program 140 has caused webpage 110 to display such that the five most popular links from links section 320 (see FIG. 3A) are listed in descending order of selection frequency in links section 320'. As such, links section 320' includes hyperlinks in the following order: job seekers link (link 322'), coupons link (link 324'), event calendar link (link 326'), photo gallery link (link 328'), and business directory link (link 330'). Links section 320' also includes a UI selectable element depicted as "More Links" (selectable element 360). Webpage adjustment program 140 may have created selectable element 360 based on one or more rules from rules database 150. Selectable element 360, when selected, may direct a user to one or more of the links from links section 320 (see FIG. 3A) that do not otherwise appear within link section 320'. For instance, about the webpage link, resources link, members link, and market your company link (see FIG. 3A) may be displayed when selectable element 360 is selected. In some embodiments, selectable element 360 opens a menu with additional selectable elements or hyperlinks. In other embodiments, selectable element 360 is a hyperlink to a new webpage that includes the additional hyperlinks.

Within the depicted example of UI window 350, link 322' is labeled as "Job Seekers" and is a hyperlink directed towards the same webpage as link 322, "Job Postings," in FIG. 3A. In the depicted example, analytics program 120 indicated that there was hesitation, prior to selection, when a cursor hovered over link 322. One potential reason for such a hesitation may be that there was confusion, by the end user, with the title of link 322. Rules stored to rules database 150 may indicate that if such hesitation exists, as potentially determined by a threshold of time, the name of the link should be changed. In some embodiments, a web developer may indicate multiple possible names for a hyperlink, such as link 322. In other embodiments, webpage adjustment program 140 may receive instructions to replace one or more words within the link with a synonym. In still other embodiments, webpage adjustment program 140 may cause an indication to be sent to a web developer or user who manages webpage 110 to alert the user, and ask for an alternate name for the link. In the depicted example, using one of the previously described methods, webpage adjustment program 140 has caused link 322' to be labeled as "Job Seekers" rather than "Job Postings" (see link 322, FIG. 3A).

As depicted, FIGS. 3A and 3B are merely one example. Embodiments in accordance with the present invention recognize that a variety of websites/webpages, software, and other applications may be modified using similar techniques as described herein. In some embodiments, rather than converting a desktop webpage to a mobile webpage, webpage adjustment program 140 adjusts versions of a webpage, such as webpage 110, as accessed by the same type of device, based on use information and other information gathered by an analysis tool, such as analytics program 120.

Figure 4:
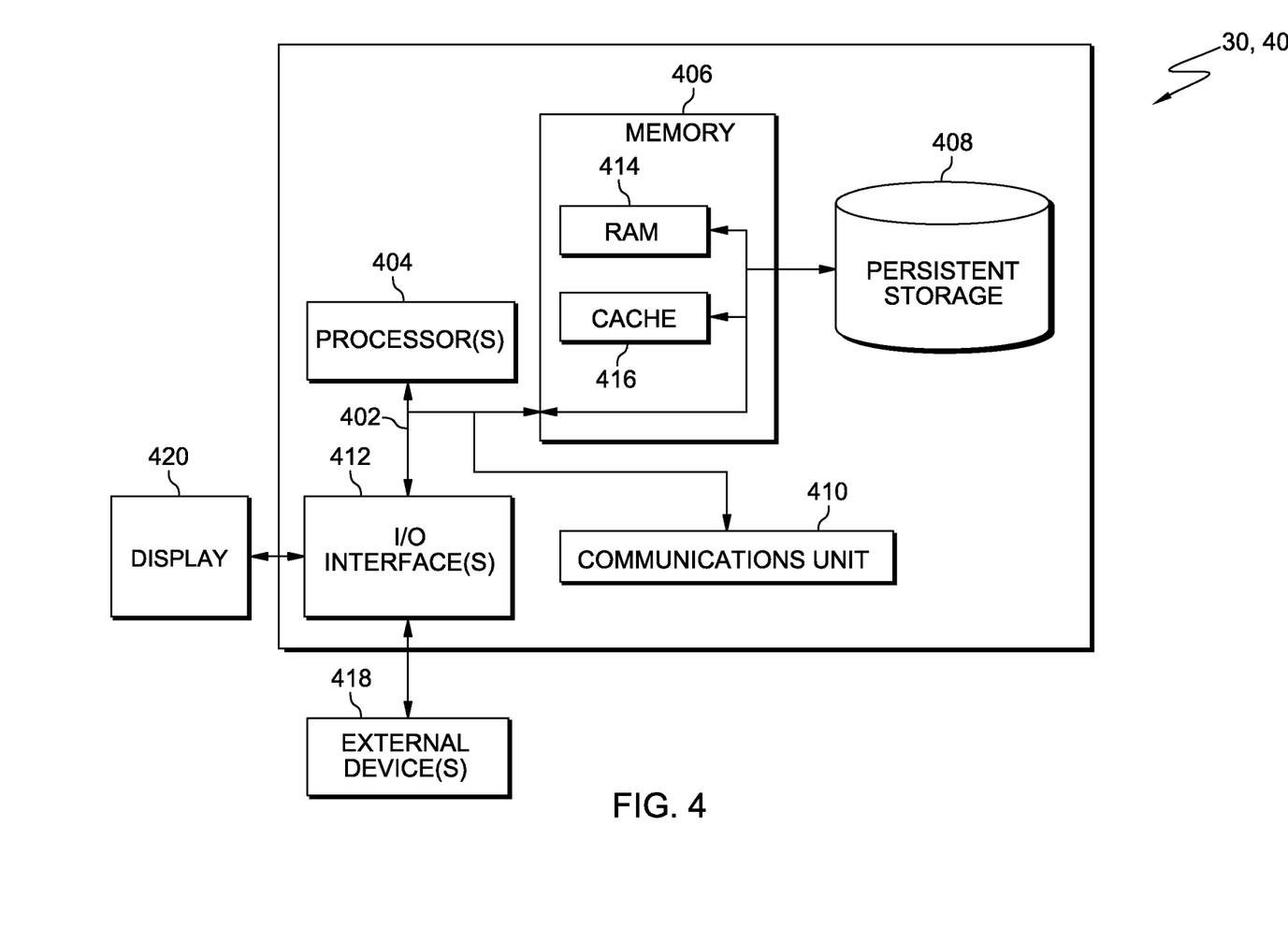
FIG. 4 depicts a block diagram of components the server and computing device, in accordance with one embodiment of the present invention.

FIG. 4 depicts a block diagram of components of server 30 and computing device 40 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 30 and computing device 40 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Webpage 110, analytics program 120, analytics report storage 130, webpage adjustment program 140, and rules database 150 are stored in persistent storage 408 of server 30 for execution and/or access by one or more of the respective computer processors 404 of server 30 via one or more memories of memory 406 of server 30. Web browser 160 is stored in persistent storage 408 of computing device 40 for execution by one or more of the respective computer processors 404 of computing device 40 via one or more memories of memory 406 of computing device 40. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Webpage 110, analytics program 120, analytics report storage 130, webpage adjustment program 140, and rules database 150 may be downloaded to persistent storage 408 of server 30 through communications unit 410 of server 30. Web browser 160 may be downloaded to persistent storage 408 of computing device 40 through communications unit 410 of computing device 40.

I/O interface(s) 412 allows for input and output of data with other devices that may be connected to server 30 or computing device 40. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., webpage 110, analytics program 120, analytics report storage 130, webpage adjustment program 140, and rules database 150, can be stored on such portable computer readable storage media and can be loaded onto persistent storage 408 of server 30 via I/O interface(s) 412 of server 30. Software and data used to practice embodiments of the present invention, e.g., web browser 160, can be stored on such portable computer readable storage media and can be loaded onto persistent storage 408 of computing device 40 via I/O interface(s) 412 of computing device 40. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for adjusting presentation of user interface (UI) elements in a webpage, the method comprising:
   monitoring, by one or more processors, usage of a webpage a plurality of users;
   determining, by one or more processors, at least one UI element to be modified within presentation of the webpage, based on at least one predefined rule and the monitored usage of the webpage by the plurality of users, wherein:
      the at least one UI element to be modified comprises a label for a hyperlink, wherein the label is different than the hyperlink; and
      the at least one predefined rule comprises a detected average hesitation period of time of the plurality of users, prior to selection, when a cursor is hovered over the label for the hyperlink;
   identifying, by one or more processors, a synonym for a word in the label for the hyperlink; and
   generating, by one or more processors, a version of the webpage comprising the at least one UI element, as modified within the presentation of the webpage to include the synonym in place of the word in the label for the hyperlink based on the detected average hesitation period of time of the plurality of users.

2. The method of claim 1, wherein the step of monitoring usage of a webpage by a plurality of users comprises:
   monitoring, by one or more processors, frequency of usage of UI elements within the webpage.

3. The method of claim 2, wherein the at least one predefined rule further comprises that UI elements shall be organized according to frequency of usage within the webpage.

4. The method of claim 1, further comprising:
   receiving a request to access the webpage from a type of a device;
   determining, by one or more processors, a version of the webpage corresponds to the type of the device; and
   causing, by one or more processors, the version of the webpage to be displayed to the device.

5. The method of claim 4, wherein the type of device is a mobile device.

6. The method of claim 1, further comprising:
   receiving a request to access the webpage; and
   wherein the at least one predefined rule further comprises at least one UI element to be modified within presentation of the webpage at runtime based on a factor associated with the monitored usage of the webpage.

7. The method of claim 6, wherein the step of determining at least one UI element to be modified within presentation of the webpage further comprises:
   determining that the factor of the predefined rule applies to the at least one UI element; and
   wherein the step of generating a version of the webpage comprising the at least one UI element, as modified within the presentation of the webpage comprises, responsive to the request to access the webpage, generating a version of the webpage at runtime based on the factor.

8. A computer program product for adjusting presentation of user interface (UI) elements in a webpage, the computer program product comprising:
   one or more computer readable storage media and program instructions stored on the one or more computer readable storage media, the program instructions comprising:
   program instructions to monitor usage of a webpage by a plurality of users;
   program instructions to determine at least one UI element to be modified within presentation of the webpage, based on at least one predefined rule and the monitored usage of the webpage by the plurality of users, wherein:
      the at least one UI element to be modified comprises a label for a hyperlink, wherein the label is different than the hyperlink; and
      the at least one predefined rule comprises a detected average hesitation period of time of the plurality of users, prior to selection, when a cursor is hovered over the label for the hyperlink;
   program instructions to identify a synonym for a word in the label for the hyperlink; and
   program instructions to generate a version of the webpage comprising the at least one UI element, as modified within the presentation of the webpage to include the synonym in place of the word in the label for the hyperlink based on the detected average hesitation period of time of the plurality of users.

9. The computer program product of claim 8, wherein program instructions to monitor usage of a webpage by a plurality of users comprise:
   program instructions to monitor frequency of usage of UI elements within the webpage.

10. The computer program product of claim 9, wherein the at least one predefined rule further comprises that UI elements shall be organized according to frequency of usage within the webpage.

11. The computer program product of claim 8, further comprising:
   program instructions, stored on the one or more computer readable storage media, to receive a request to access the webpage from a type of a device;
   program instructions, stored on the one or more computer readable storage media, to determine a version of the webpage corresponds to the type of the device; and
   program instructions, stored on the one or more computer readable storage media, to cause the version of the webpage to be displayed to the device.

12. The computer program product of claim 11, wherein the type of device is a mobile device.

13. The computer program product of claim 8, further comprising:
   program instructions, stored on the one or more computer readable storage media, to receive a request to access the webpage; and
   wherein the at least one predefined rule further comprises at least one UI element to be modified within presentation of the webpage at runtime based on a factor associated with the monitored usage of the webpage.

14. The computer program product of claim 13, wherein program instructions to determine at least one UI element to be modified within presentation of the webpage further comprise:

program instructions to determine that the factor of the predefined rule applies to the at least one UI element; and wherein program instructions to generate a version of the webpage comprising the at least one UI element, as modified within the presentation of the webpage comprise program instructions to, responsive to the request to access the webpage, generate a version of the webpage at runtime based on the factor.

15. A computer system for adjusting presentation of user interface (UI) elements in a webpage, the computer system comprising:

one or more computer processors, one or more computer readable storage media, and program instructions stored on the computer readable storage media for execution by at least one of the one or more processors, the program instructions comprising:

program instructions to monitor usage of a webpage by a plurality of users;

program instructions to determine at least one UI element to be modified within presentation of the webpage, based on at least one predefined rule and the monitored usage of the webpage by the plurality of users, wherein:

the at least one UI element to be modified comprises a label for a hyperlink, wherein the label is different than the hyperlink; and the at least one predefined rule comprises a detected average hesitation period of time of the plurality of users, prior to selection, when a cursor is hovered over the label for the hyperlink;

program instructions to identify a synonym for a word in the label for the hyperlink; and program instructions to generate a version of the webpage comprising the at least one UI element, as modified within the presentation of the webpage to include the synonym in place of the word in the label for the hyperlink based on the detected average hesitation period of time of the plurality of users.

16. The computer system of claim 15, wherein program instructions to monitor usage of a webpage by a plurality of users comprise:

program instructions to monitor frequency of usage of UI elements within the webpage.

17. The computer system of claim 15, further comprising:

program instructions, stored on the computer readable storage media for execution by at least one of the one or more processors, to receive a request to access the webpage from a type of a device;

program instructions, stored on the computer readable storage media for execution by at least one of the one or more processors, to determine a version of the webpage corresponds to the type of the device; and program instructions, stored on the computer readable storage media for execution by at least one of the one or more processors, to cause the version of the webpage to be displayed to the device.

18. The computer system of claim 17, wherein the type of device is a mobile device.

19. The computer system of claim 15, further comprising:

program instructions, stored on the computer readable storage media for execution by at least one of the one or more processors, to receive a request to access the webpage; and wherein the at least one predefined rule further comprises at least one UI element to be modified within presentation of the webpage at runtime based on a factor associated with the monitored usage of the webpage.

20. The computer system of claim 19, wherein program instructions to determine at least one UI element to be modified within presentation of the webpage further comprise:

program instructions to determine that the factor of the predefined rule applies to the at least one UI element; and wherein program instructions to generate a version of the webpage comprising the at least one UI element, as modified within the presentation of the webpage comprise program instructions to, responsive to the request to access the webpage, generate a version of the webpage at runtime based on the factor.

* * * * *